United States Patent [19]

Mason

[11] 4,222,172
[45] Sep. 16, 1980

[54] VANE AREA MEASURING DEVICE
[75] Inventor: George W. Mason, Indianapolis, Ind.
[73] Assignee: General Motors Corporation, Detroit, Mich.
[21] Appl. No.: 2,933
[22] Filed: Jan. 12, 1979
[51] Int. Cl.³ .............................................. G01B 5/20
[52] U.S. Cl. ................................................ 33/174 C
[58] Field of Search ....................... 33/174 C, 174 PA

[56] References Cited
U.S. PATENT DOCUMENTS

| | | | |
|---|---|---|---|
| 3,627,997 | 12/1971 | Samuels et al. | 33/174 C |
| 3,639,994 | 2/1972 | Palmenburg | 33/174 PA |
| 3,678,585 | 7/1972 | Dabrush et al. | 33/174 C |
| 3,732,946 | 5/1973 | McKnight et al. | 73/457 |
| 3,757,424 | 9/1973 | Palmenburg | 33/174 C |
| 3,832,784 | 9/1974 | Samuels et al. | 33/174 C |
| 3,959,886 | 6/1976 | Griggs | 33/174 C |

Primary Examiner—Richard R. Stearns
Attorney, Agent, or Firm—J. C. Evans

[57] ABSTRACT

An area measurement device for determining the single vane throat area of a nozzle guide vane with inner and outer bands adapted for assembly in a ring of vanes having a close tolerance cold throat flow area through the entire ring annulus and wherein each of the guide vanes includes aft radial reference surfaces and a radially outwardly directed side reference surface locatable on internal engine support surfaces for positioning the vane within an engine annulus support assembly. Each vane also has an inner band locater hole for fixedly securing the inner band of the nozzle to an internally located engine support. The device has gages of the self-mastering type and includes a latch mechanism for setting the device in a vane height measurement position or in a vane throat measurement position; a single nozzle vane is installed on the device on two spaced reference surfaces thereon corresponding to radial engine annulus locating surfaces and the gage further includes a locating pin to align the inner band locater hole in its engine position; a third reference surface circumferentially locates the outer band of the vane in an engine mounted position.

2 Claims, 7 Drawing Figures

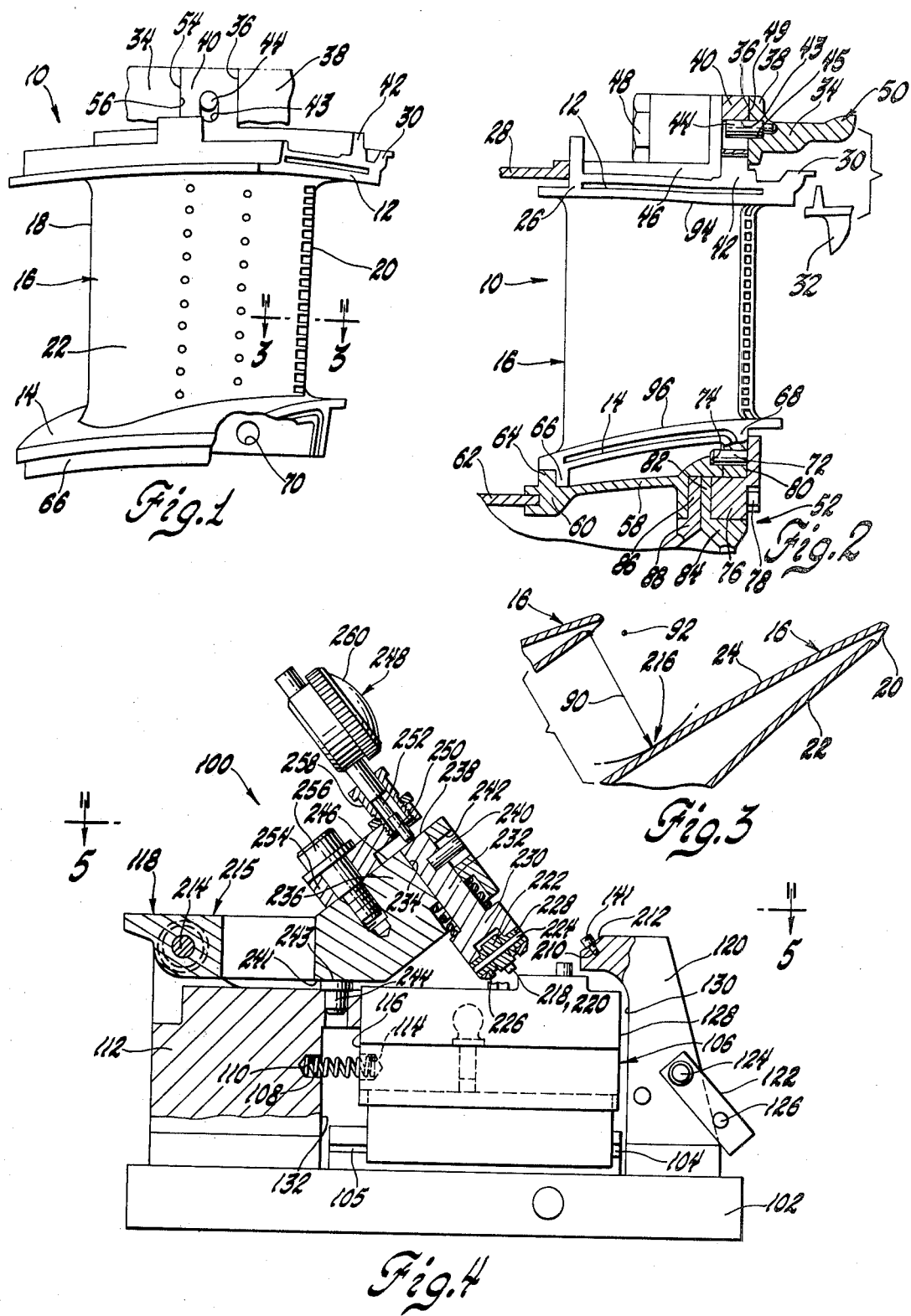

HP1 TWO COMPARTMENT TURBINE VANE
THROAT AREA NOMOGRAM

VANE AREA MEASURING DEVICE

This invention relates to turbine vane nozzle assemblies, and more particularly to turbine vane gage devices for predetermining the throat area of individual and ring-connected ones of a plurality of nozzle vanes in a vane annulus support assembly for a downstream turbine rotor.

The invention herein described was made in the course of work under a contract or subcontract thereunder with the Department of Defense.

In vane annulus support assemblies for high pressure turbines, it is necessary to closely control the total throat area for flow of gas to the turbine. Such control is reflected by a cold build throat area having closely controlled cold build throat area limits or assembled tolerances.

Various turbine engine vane gage devices are known. For example, devices measure the amount of bow in a turbine vane, as set forth in U.S. Pat. No. 3,678,585 issued July 25, 1972 to Dabrush et al. Such devices do not measure the effective throat flow area characteristics of single ones of a plurality of vanes that are insertable in a vane annulus support assembly.

An arrangement for determining the minimum area between vanes in an assembled annulus is set forth in U.S. Pat. No. 3,732,946 which discloses an ultrasonic nozzle measuring system for determining throat area. It measures throat areas between assembled vanes and does not relate to an arrangement for preselecting vane components having a given throat flow area rating which can be subsequently assembled in a vane annulus support assembly to produce a predeterminable controlled total flow area therethrough with close limits of total cold build throat area.

A further turbine vane gage arrangement is set forth in U.S. Pat. No. 3,832,784. It is utilized to determine the classification of the shape of individual turbine vane components without distorting the blade surfaces.

It is desirable, however, to preselect individual ones of a plurality of separate turbine vane components and attribute a flow area therethrough before assembly.

Such measurement of the individual turbine vane preferably is accomplished before any of the vanes are located in place within an engine vane annulus support assembly. Moreover, it is desirable to measure the flow area characteristics of individual ones of the nozzle vanes early in a blade finishing process.

Accordingly, an object of the present invention is to provide an improved gage device for determining the throat area of a single vane, including means for measuring variation in vane throat width and flow path height of an individual vane before it is assembled within an engine vane annulus support assembly.

Yet another object of the present invention is to provide an improved gage device for determining the flow area effectiveness of individual vane components for assembly in a vane annulus support assembly or other like annulus wherein the gage is configured to define reference surfaces corresponding to the engine locating surfaces for the individual vanes as finally assembled in an engine vane annulus support assembly and the gage further includes means to measure variations from a nominal vane height and throat width at the minimal throat region of the vane and wherein the measurement variance is determined on single vanes when located within the gage and by means that define a first variation from a nominal vane height and a second variation from a nominal vane throat dimension which are then available for use with a throat area nomogram to establish the total throat area effectiveness of the given individual vanes measured by the gage assembly.

Still another object of the present invention is to provide an improved throat area measurement gage assembly for determining the nozzle vane throat flow area effectiveness of an individual vane prior to its assembly within an engine vane annulus support assembly by the provision of a movable gage carriage having spaced locating surfaces thereon engageable with a first pair of reference surfaces on an individual nozzle vane for positioning the individual vane in a radial plane corresponding to that found in an engine support annulus for the vane and wherein the carriage includes a second locating surface thereon to locate a side reference surface on the vane at a circumferential point that it would occupy within an engine annulus support assembly for the vane; a carriage pin being provided to further locate the vane in a radial height position in a finally assembled engine support annulus; the gage further including means for locking the vane in a first height-measurement position and means for determining a nominal vane height variance of the dimension between inner and outer bands of the individual vane component and wherein means are provided to release the carriage from its height position for movement to a throat measurement position where means are arranged to lock the individual vane in a throat width measurement position and throat register means are engageable with the air foil surface for measuring the variation of the throat width of the individual blade from a desired nominal throat width dimension, thereby to establish throat and height dimension variations that are used in conjunction with a throat area nomogram for producing a final throat area characteristic for the vane as assembled in conjunction with other vanes in a vane annulus support assembly for a gas turbine engine.

Still another object of the present invention is to provide an improved nozzle throat area measurement apparatus for determining the throat flow area effect of a single nozzle vane component having an air foil interconnecting an inner band and an outer band and where the air foil includes a leading edge and a trailing edge and a predetermined camber therebetween and a first pair of reference surfaces thereon supportable on internal engine surfaces to locate the vane in a perpendicular relationship to the axis of rotation of a downstream turbine and wherein the vane further includes a side reference surface for locating the vane circumferentially within a vane annulus supporting assembly and a base reference hole for locating it vertically within the vane annulus support assembly; the gage device including a movable carriage having a first pair of surfaces thereon engageable with the first pair of reference surfaces on the vane and a second locating surface on the carriage to locate the side reference surface of the vane to establish its corresponding circumferential location within an engine vane annulus support assembly; the gage device further including first and second means for locking the turbine vane in contact with the reference surfaces at a height measurement position and in a second throat width measurement position; and means including a latch gate being associated with the movable carriage for releasably locating it in either of the vertical height measurement position or the throat width measurement position for the vane; the gage including a pair of relatively movable jaws thereon having indicator points locatable against the inner surface of the inner and outer bands of the turbine vane when in its height measurement position and the jaws having relatively movable portions thereon with exposed surfaces that are normally aligned when the vane has a desired vane height and spaced apart when there is a variation from the design vane height; first follower and indicator means being provided for measuring the misalignment of the exposed surfaces to indicate a measured variance of height from a desired vertical height datum between the inner and outer surfaces of the inner and outer bands of the vane being measured and wherein the latch gate can be released to cause the carriage to be shifted into a throat width measurement position at which first and second spaced throat registers are located to be engageable with the curved air foil surface of the vane and wherein the throat registers have two relatively movable outer surfaces thereon that are positioned with respect to second follower and indicator means to indicate the individual vane has a desired throat width when in its mounted vane annulus support assembly position or a variation from a desired nominal throat width dimension; the variations in either vane height or throat width being usable in association with a throat area nomogram to indicate the total flow area effectiveness of a given nozzle vane prior to its assembly in a vane annulus support assembly of a gas turbine engine.

These and other objects and advantages of the invention will be apparent from the following description, reference being had to the accompanying drawings in which:

FIG. 1 is a view in perspective of a turbine vane with a circumferential reference surface on the vane seated in a serrated portion of a vane annulus support assembly;

FIG. 2 is a fragmentary, vertical sectional view of a vane annulus support assembly for a turbine nozzle guide vane measured for area determination thereof by the throat area gage assembly of the present invention prior to installation of the vane;

FIG. 3 is a fragmentary cross-sectional view taken along the line 3—3 of FIG. 1 showing trailing edge portions of a pair of nozzle guide vanes in the vane annulus support assembly of FIG. 2 showing nominal throat width and nominal height positions;

FIG. 4 is a side elevational view, partially sectioned, of the gage assembly of the present invention showing throat register and gage measurement components thereof;

Figure 5:
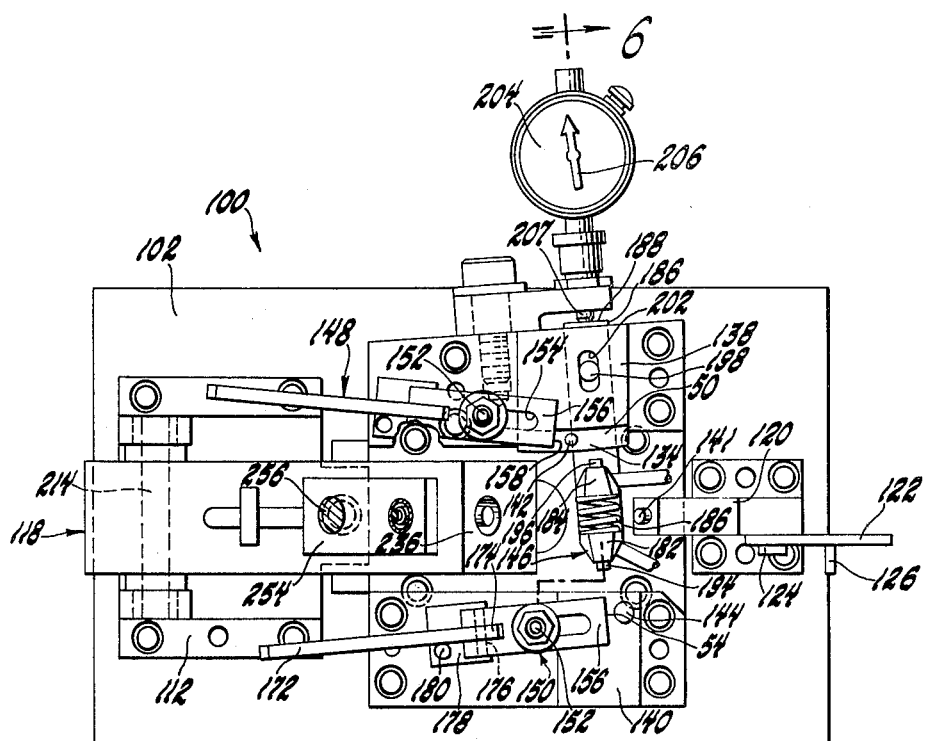
FIG. 5 is a horizontal sectional view of the gage assembly in FIG. 4 taken along the line 5—5 of FIG. 4 looking in the direction of the arrows.

Referring now to FIG. 1, a nozzle guide vane 10 is illustrated, including an outer band 12 and an inner band 14. The bands are interconnected by an air foil assembly 16 including a leading edge 18 and a trailing edge 20. The leading edge 18 is connected to the trailing edge 20 by a concave surface 22 on one side of the assembly and a convex surface 24 on the opposite side thereof for defining aerodynamic flow surfaces through a nozzle vane annulus leading to a gas turbine rotor.

A leading edge flange 26 on the outer band 12 is aligned with a combustor transition 28. On the downstream end of the nozzle guide vane 10, a seal flange 30 thereon is located with respect to a turbine blade shroud 32 and held in place by a serrated ring assembly 34 that is included to connect the turbine vane nozzle 10 to the outer case of the engine.

The ring assembly 34, as shown in FIG. 2, includes a plurality of serrations 36 at circumferential points around a forward flange 38 thereon to supportingly receive a radially outwardly directed locating tab 40 on an intermediate flange 42 formed on the outer surface of the outer band 12 of nozzle guide vane 10. The tab 40 includes an elongated slot 43 therein in which is located a pin 44 with the end thereof fit within a bore 45 in ring assembly 34. The pin 44 is held in place by a retainer plate 46 held in place by a plurality of fastener assemblies 48.

The tab 40 has an aft surface 49 thereon that engages the flange 38 to define a first vertical reference surface for the nozzle assembly 10 when in its supported position in a vane annulus support assembly 50, which includes the ring 34 and an inboard nozzle support 52. Additionally, the tab 40 includes a side reference surface 54 thereon that is in engagement with a side surface 56 of the serration 36 to define a circumferential locating surface for the nozzle vane 10 when in place within the nozzle annulus support assembly 50. Each vane 10 is located within an inner band support plate 58 having a grooved end portion 60 to receive a combustor liner member 62 and an upstanding flange 64 thereon that serves as a guide surface for a dependent forward flange 66 on the inner band 14.

A dependent aft flange 68 on the inner band 14 includes a bore 70 therethrough having a locating pin 72 therein which is located at one end thereof within a bore 74 in an aft end of the inner band support plate 58. The inboard support assembly 52 further includes a clamp plate 76 held by screws 78 against a vertical reference surface 80 on the downstream side of the rear flange 68. The clamp plate 76 engages the outer lip 82 of a support disc 84 and it, in turn, is held against an outer lip 86 of a second support disc 88 to the bearing support assembly for a gas turbine engine.

The support structure represented by the serrated ring assembly 34 and the support discs 84, 88 are representative of vane annulus support components commonly found in gas turbine engines. The individual nozzle guide vanes 10, as shown in FIGS. 2 and 3, are fit within the serrations 36 to set their circumferential position. Vanes 10 are aligned in a radial plane by the reference surfaces 49, 80. When in such referenced positions, the trailing edges of adjacent air foil assemblies 16 are fixedly referenced with respect to one another to define a minimum width throat passage 90 therebetween as shown in FIG. 3. A nominal vertical height for a pair of air foil assemblies 16 is established along a vertical line from a trailing edge point 92 shown in FIG. 3 between inner surfaces 94, 96 of bands 12, 14 respectively. The product of the vertical height at 90 times the minimum width distance between the air foil assemblies 16 at the throat 90 therebetween represents a flow area which, when computed for the total annulus, represents a total cold build throat area through a plurality of nozzle guide vanes assembled in a 360° array.

In gas turbine engines, such a cold build throat area must be maintained within closely held tolerances to meet engine performance requirements.

In the past, various approaches have been taken to determine the flow area through a nozzle assembly. One approach computes the throat area by physically measuring the distance between the adjacent individual nozzle vane components when assembled in a ring and measuring the vertical height at the throat to compute the total flow area. In some cases, gaging tools such as the sonic measurement tool set forth in U.S. Pat. No. 3,732,946 are utilized to determine the flow area through the assembled nozzle ring by use of an estimating procedure referred to in the '946 patent as Simpson's Rule.

In accordance with the present invention, the precalculation of total throat gas flow area through a ring of nozzle guide vanes such as guide vanes 10 is established by means of an improved self-mastering gage assembly 100 that is characterized by inclusion of reference surfaces thereon to simulate those found in a standard vane annulus support assembly for a gas turbine engine.

The gage approach is applicable with minor changes to the determination of the flow area effect of any single nozzle guide vane for use in a vane annulus or like arrangements having separate partitions therebetween in the assembled form with the separate partitions being of an air foil shape with a determinable flow area therethrough.

In the illustrated self-mastering gage assembly, a base 102 is included, having a lateral track bar 104 with side grooves 105 thereon that slidably support a movable vane chucking block or carriage 106. The carriage 106 is biased to the right as viewed in FIG. 5 by a compression spring 108 having one end thereof seated within a bore 110 of an upstanding fixed side block 112 on the base 102 at one end thereof and within a bore 114 in an inboard end surface 116 of the movable carriage 106.

The side block 112 supports a pivotal width measuring gate 118 that cooperates with a fixed width register arm 120 on the opposite side of the base 102. A latch plate 122 on arm 120 is pivotally supported by a screw 124 at an intermediate point on the arm 120. The latch plate 122 has a side handle 126 thereon to position it in a release position, as shown in FIG. 4 on one side of the arm 120 at which point the spring 108 will shift the movable carriage 106 laterally of the groove track 105 in the bar 104 until abutment occurs between the end surface 128 on the carriage 106 and the inboard surface 130 on the register arm 120. This carriage position will henceforth be referenced as a throat width measurement position.

The movable carriage 106 is movable to the left, as shown in FIG. 4, to a position where the surface 116 is in engagement with an inboard surface 132 of the fixed side block 112 at which point the latch plate 122 is pivoted about the screw 124 until the end thereof is seated against the end surface 128. The length of the latch plate 122 is selected to hold the carriage in a seated, height-measurement position.

Figure 6:
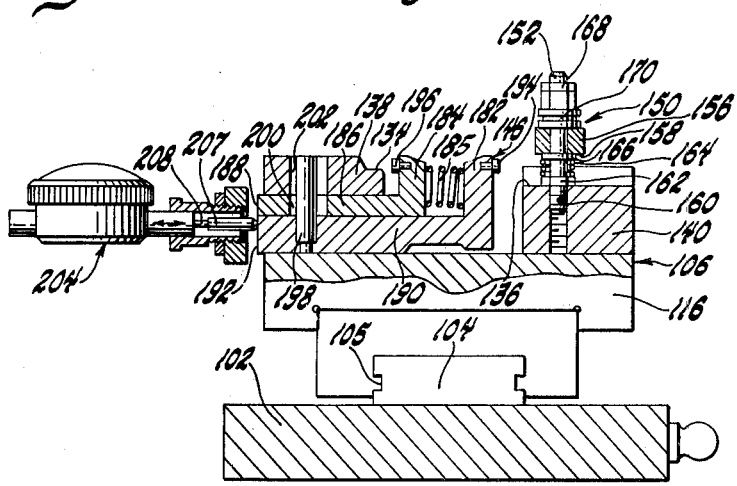
FIG. 6 is a vertical sectional view of the gage assembly taken along the line 6—6 of FIG. 5 looking in the direction of the arrows and showing a vertical height gage indicator dial in elevation.

When the movable carriage 106 is in its throat width measurement position, locating surfaces 134, 136 on spaced gage blocks 138, 140 on the movable carriage 106, best seen in FIG. 6, are located in spaced relationship to an indicator point 141 on the width-measurement arm 120 so that a turbine nozzle guide vane 10 corresponding to that in FIGS. 1 and 2 can be placed with its reference surfaces 49, 80 on the locating surfaces 134, 136, respectively. The surfaces 134, 136 thus constitute reference surfaces corresponding to those found in a vane annulus support assembly as shown in association with the nozzle guide vane 10 in FIG. 2. A locating pin 142 on the surface 134 is located in the bore 70 at the inner band 14 of the vane 10 to fix it radially as mounted in an engine and the surface 136 has a bump pin 144 thereon that is engageable with the side reference surface 54 of the tab 56 as partially shown in FIG. 5 to fix vane 10 circumferentially as if mounted in an engine.

When the nozzle guide vane 10 is so positioned, a vertical height measuring apparatus 146 is positioned with respect to the inner surfaces 94, 96 of the nozzle guide vane 10 at a position to determine the height of the blade at the nominal height position corresponding to the vertical distance between surfaces 94, 96 at point 92 as shown in FIG. 3, corresponding to the height that an individual nozzle vane component 10 has at its minimum width throat when mounted in a vane annulus support assembly.

The height measurement apparatus 146 is associated with a pair of vane clamp assemblies 148, 150. Each of the clamp assemblies 148, 150 includes a holddown screw 152 directed through a slot 154 in a clamp plate 156 having a pressure surface or dependent tip 158 thereon at the end thereof. At an intermediate point of the slot 154, the adjustment screw 152 extends upwardly from a tapped hole 160 and is held in place by means of a lock nut 162 as shown in FIG. 6. A spring 164 biases the clamp bar 156 upwardly, being interposed between the lock nut 162 and a washer 166 on the underside of the clamp bar 156. An adjustment nut 168 and a plurality of washers 170 are secured to the upper threaded end of the screw 152 so that the amount of spring compression can be adjusted. The clamp bar 156 is vertically positioned against the force of the spring by a handle 172 having an eccentric end 174 thereon pivotally supported by a pin 176 for rotation with respect to a plate 178 secured by a screw 180 to the carriage 106 and raised therefrom. When the throw of the eccentric end 174 is at a maximum point between the pivot pin 176 and the block 178, the pressure surface 158 will positively retain the vane 10 in place in its vertical height measurement position. When this position is made, the vertical height measuring apparatus 146 is located to determine the amount that the height of the blade or vane varies from a desired nominal vertical height for such a unit. More particularly, the vertical height measuring apparatus 146 includes a pair of relatively movable jaws 182, 184 biased apart from one another by means of a compression spring 185 located therebetween and in engagement with each jaw 182, 184. The jaw 184 is carried on a movable platform 186 with an exposed end surface 188 thereon and is relatively movable with respect to a platform 190 connected to the jaw 182. The platform 190 also includes an exposed side end surface 192 thereon. An indicator point 194 is supported on the jaw 182 in facing relationship to the inner surface 94 of an outer band 12 of the located nozzle guide vane 10 and a second indicator point 196 is located on the jaw 184 in facing relationship to the inner surface 96 of the inner band 14 of the vane 10. A dowel 198 secured to the movable platform 190 extends upwardly through aligned slots 200, 202 formed respectively in the platform 186 and the gage block 138 to guide the relative lateral movement of the measurement jaws 182, 184 with respect to one another. The spring 186 will force the indicator points 194, 196 against the vane band surfaces and if the height of the vane at the throat region is either greater or less than a desired nominal height for a given nozzle guide vane 10, the exposed side surfaces 188, 192 will be misaligned from one another. Such misalignment is detected by a side-mounted measuring gage 204 having an indicator 206 thereon and including a follower pin 207 that sweeps across the exposed surfaces 188, 192 to reciprocate a gage shaft 208, this movement being converted within the housing of the measuring gage 204 to rotary movement of the indicator 206 to give a visual indication of the amount of departure from the desired vertical height standard.

Following measurement of the vertical height between the inner and outer bands of a nozzle guide vane 10 located on the movable vane chucking block or carriage 106, the clamps 148, 150 are released and the latch plate 122 is located in the position shown in FIG. 4. This causes the block 106 to move to the throat width measuring station at which the throat width measuring gate 118 is operative along with the indicator point 141 with its stem 210 seated in an inclined inboard surface 212 of the width measurement arm 120.

The width measuring gate 118 during the height measuring operation is pivoted about a pin 214 to the fixed side block 112 and raised upwardly thereof. Once the carriage 106 is positioned as shown in FIG. 4, however, the assembly 118 is pivoted downwardly toward the upper surface of the carriage 106. The indicator point 141 is located to contact the convex side of the air foil 16 at a point shown by the reference numeral 216 in FIG. 3 and a pair of indicator points 218, 220 are carried by an adjustable head 222 on gate 118 so that they will be aligned with the concave side of the vane at the trailing edge thereof as diagrammatically shown in the FIG. 3 representation of the air foil assemblies of the vane.

The adjustable head 222 is supported by a pin 224 in journals 226, 228 on either side of a bifurcated end 230 on a movable platform 232 that is received within a guide slot 234 through an inclined upwardly, extending side portion 236 of the gate 118. The platform 232 includes an outboard exposed surface 238. A dowel 240 fastened to one side of the movable platform 232 extends into a slot 242 of the portion 236 for guiding the head 230 dfor reciprocation with respect to the gate 118 during a throat width gaging operation.

When the gate 118 is in its throat width measuring position, the inboard bottom surface 241 thereon is located against a reference stop 243 defined by the head of a rest button 244.

The amount of misalignment between the reference surface 238 and an adjoining reference surface 246 on the gate 118 is established by a throat width gage 248 having a surface detecting pin 250 thereon that will shift an indicator dial shaft 252 in a receiprocal directon as the gage is pivoted by a support arm 254 about a pin 256 that is secured to gate portion 236. Prior to this measurement action, the gage indicator of gage 248 is set to zero and the gage is then moved with respect to the reference surfaces to record a deviation from the desired throat width dimension. The indicator of the gage 248 will indicate either a plus or a minus deviation from a nominal vane throat width dimension which is directly read on a dial face 260 on the gage 248.

Figure 7:
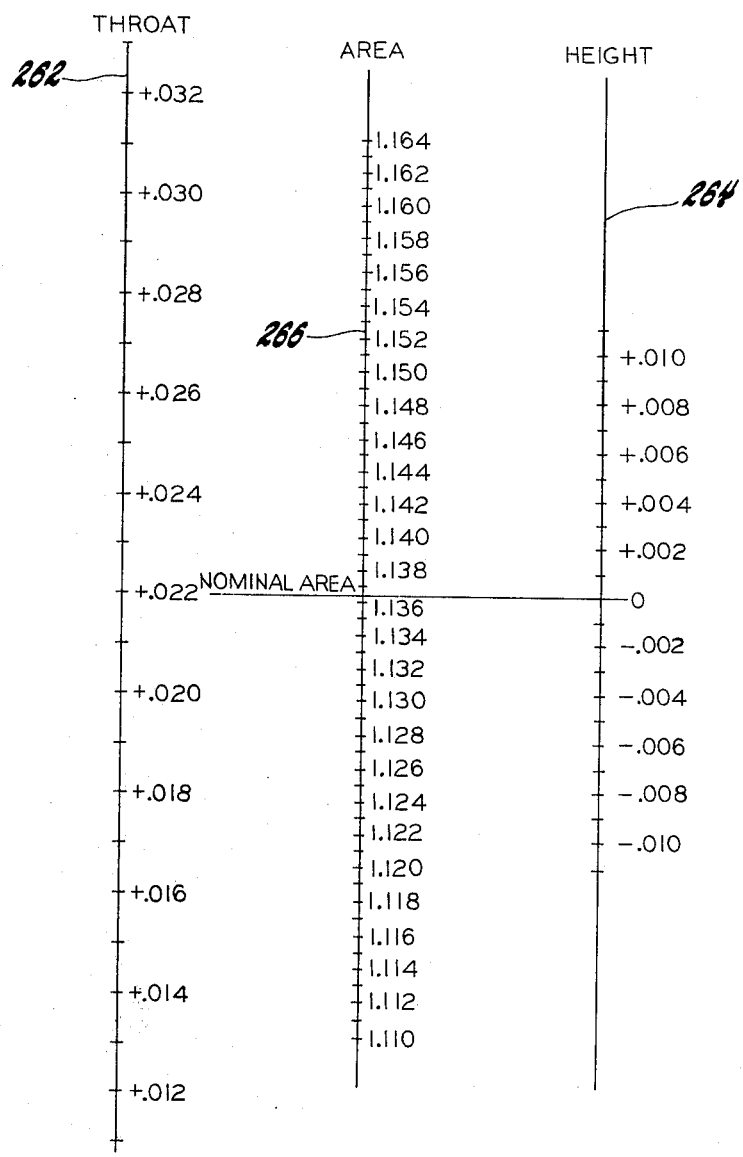
FIG. 7 is a nomogram for use with the variance outputs of the gage of FIGS. 4-6.

A nomogram is then utilized of the type set forth in FIG. 7 to indicate the effective flow area rating that the vane will produce when placed within a ring or annulus of like vanes. To accomplish this, both the throat deviation and the height deviation are established on the respective vertical lines shown in FIG. 7 at 262 and 264 and the point that they intersect on the area line 266 represents the area of flow through the minimum throat region of the vane when placed with respect to other vanes in the annulus of a gas turbine engine.

A plurality of vanes of differing area can be preselected with gage assembly 100 to produce a desired resultant total area of flow through a nozzle assembly to a gas turbine engine. Such preselection of flow area prior to assembly of the component parts of a ring of vanes in an annulus of an engine eliminates unnecessary "cut and try" assembly and assures that the engine specifications for flow area required for a given engine performance can be achieved in the assembled unit without modification of the vanes once they are assembled in the support annulus of the engine.

While the embodiment of the present invention as herein disclosed constitutes a preferred form, it is to be understood that other forms might be adopted.

The embodiments of the invention in which an exclusive property or privilege is claimed are defined as follows:

1. A single airfoil throat area measurement apparatus for determining airfoil throat flow area of a vane or blade having an airfoil surface, inner and outer bands and radial plane reference surfaces, a side circumferential position reference surface, and a vertical height reference comprising: a movable gage carriage having spaced locating surfaces engageable with the radial plane reference surfaces for mounting an airfoil in a radial plane corresponding to an engine support annulus, a second locating surface on the carriage to locate the side reference surface of the airfoil at a position corresponding to that within the engine support annulus, means on the carriage to define an index for the vertical reference to locate the vane or blade in a vertical radial position corresponding to that within the engine support annulus, means for locking the vane or blade in contact with the locating surfaces, latch means interlocking with said carriage for holding the carriage in a vertical height measuring position, first measurement means with indicator points thereon located within the inner and outer bands of the mounted airfoil to cause the indicator points thereon to be maintained against the inner and outer bands and including exposed surfaces normally aligned with one another to indicate a desired height datum between the inner and outer bands thereof, said first measurement means further including means for measuring misalignment of the exposed surfaces to indicate a variance of height from a desired vertical height datum between the inner and outer bands, said latch means being released out of interlocking relationship with said carriage to shift said carriage to locate it in a throat width measuring position, first and second throat registers engageable with the airfoil surface of said vane or blade when said carriage is in the throat width measuring position, one of said registers having two relatively movable outer surfaces thereon positioned with respect to one another when the carriage is in its throat width measurement position, and gage means on one of said last mentioned outer surfaces including means for indicating the throat width variation from a desired nominal throat width dimension whereby direct height and throat width variations can be determined prior to assembly of the airfoils in a ring in a gas turbine engine gas flow system.

2. A turbine nozzle throat area measurement apparatus for determining nozzle vane throat flow area of a vane having an airfoil surface, inner and outer bands and radial plane reference surfaces, a side circumferential position reference surface and a vertical height reference hole comprising: a movable gage carriage having spaced locating surfaces engageable with the radial plane reference surfaces for mounting a turbine vane in a radial plane corresponding to an engine support annulus, a second locating surface on the carriage to locate the side reference surface of the vane at a position corresponding to that within the engine support annulus, a pin on the carriage to define an index for the hole to locate the vane in a vertical radial position within the engine support annulus, means for locking the turbine vane in contact with the locating surfaces and in contact with the pin, a latch plate interlocking with said carriage to hold the carriage in a vertical height measuring position, a pair of relatively movable jaws with indicator points thereon located within the inner and outer bands of the mounted turbine vane, means to bias the jaws apart to cause the indicator points thereon to be maintained against the inner and outer bands of vane, said opposed jaws having relatively movable platforms thereon with exposed surfaces normally aligned with one another to indicate a desired vane height datum between the inner and outer bands thereof, and means for measuring misalignment of the exposed surfaces to indicate a height variance from a desired vertical height datum between the inner and outer bands, said latch plate being released out of interlocking relationship with said carriage, means for shifting said released carriage with respect to said movable jaws to locate the carriage and vane in a throat width measuring position, first and second throat registers engageable with the airfoil surface of said vane when said carriage is in the throat width measuring position, one of said registers having two relatively movable exposed outer surfaces thereon positioned with respect to one another when the carriage is in its throat width measurement position and means on one of said last mentioned exposed surfaces including means for indicating the throat width variation from a desired nominal throat width dimension whereby direct vane height and throat width variations can be determined prior to assembly of the vane in a ring of nozzle vanes in a gas turbine engine gas flow system.

* * * * *